United States Patent [19]

Newman

[11] 3,714,833
[45] Feb. 6, 1973

[54] TEST STAND SYSTEM FOR VACUUM CHAMBERS

[75] Inventor: Dewey F. Newman, Huntsville, Ala.

[73] Assignee: The United States of America as represented by the Administrator of the National Aeronautics and Space Administration

[22] Filed: Dec. 23, 1971

[21] Appl. No.: 211,411

[52] U.S. Cl. ............................................. 73/432 SD
[51] Int. Cl. .............................................. G01d 21/00
[58] Field of Search ....... 73/432 R, 432 SD; 117/119; 99/270, 272

[56] References Cited

UNITED STATES PATENTS

| | | | |
|---|---|---|---|
| 1,343,842 | 6/1920 | Piersol | 117/119 |
| 2,373,333 | 4/1945 | Ohge | 73/432 SD |
| 2,740,928 | 3/1956 | Ward | 117/119 |

FOREIGN PATENTS OR APPLICATIONS 1,457,604   9/1906   France ......................... 73/432 SD Primary Examiner—S. Clement Swisher
Attorney—L. D. Wofford, Jr. et al.

[57] ABSTRACT

A test stand system for supporting test items within a vacuum chamber comprising a frame adapted to conform to the inside of the vacuum chamber and supporting a central vertical shaft which shaft is rotatable on bearings located at each end thereof. The shaft is rotated through a drive that is manually actuated externally of the vacuum chamber. A plurality of vertically spaced plates are adjustable fixed to the vertical shaft for supporting various test "setups" as required. The test items may be rotated during a test without disturbing the vacuum.

4 Claims, 2 Drawing Figures

TEST STAND SYSTEM FOR VACUUM CHAMBERS

ORIGIN OF THE INVENTION

The invention described herein was made by an employee of the United States Government and may be manufactured and used by or for the Government for governmental purposes without the payment of any royalties thereon or therefor.

BACKGROUND OF THE INVENTION

This invention relates generally to vacuum testing and more particularly to a system for supporting test items within a vacuum chamber during vacuum testing.

Laboratory vacuum chambers of the bell jar type are used extensively for various testing and experimental purposes. In using vacuum chambers in the laboratory it is often desired to place a number of test "setups" within the vacuum chamber for simultaneous testing. A test setup may comprise, for example, the object being tested in the vacuum environment plus a heating or cooling device for establishing the desired temperature in the vicinity of the test object along with one or more detectors for detecting contamination and possible reactions, e.g. outgassing, of the test object. Tubes and cables for conducting liquid and electric signals typically extend from each setup within the vacuum chamber to locations outside the chamber necessitating the use of vacuum-tight passages through the wall of the vacuum chamber.

The mounting of the test setups within the vacuum chamber is an important and often critical aspect of the testing operation. The components of a test setup often need to be mounted in precise positions and relationships and at times need to be moved to different positions within the vacuum chamber during a test. It is highly desirable that any movement of the components during a test be accomplished without having to disturb the vacuum since this would downgrade the simulation and result in inconvenience and loss of time.

Prior test stands for bell jar vacuum chambers are deemed inadequate in that desired movement of the test setup during a test requires disturbance of the vacuum and the test stands to not provide for efficient use of the space within the vacuum chamber.

SUMMARY OF THE INVENTION

The invention comprises a frame within a vacuum chamber supporting a central vertical shaft that is rotatable about its vertical axis through a device that is manually actuated externally of the vacuum chamber. A plurality of vertically spaced plates are adjustably secured to the vertical shaft for supporting test items.

Accordingly, it is a general object of the present invention to provide an improved test stand system for vacuum chambers.

A more specific object of the invention is to provide a test stand system for bell jar type vacuum chambers wherein the position of the test items supported on the test stand may be adjusted during a vacuum test without disturbing the vacuum.

Another object of the invention is to provide a simple and economical test stand system for bell jar vacuum chambers that affords a more efficient use of the space within the vacuum chamber so that more items may be tested simultaneously.

These and other objects and advantages of the invention will become apparent upon reference to the following specification, attendant claims and drawing.

DESCRIPTION OF THE PREFERRED EMBODIMENT

Figure 1:
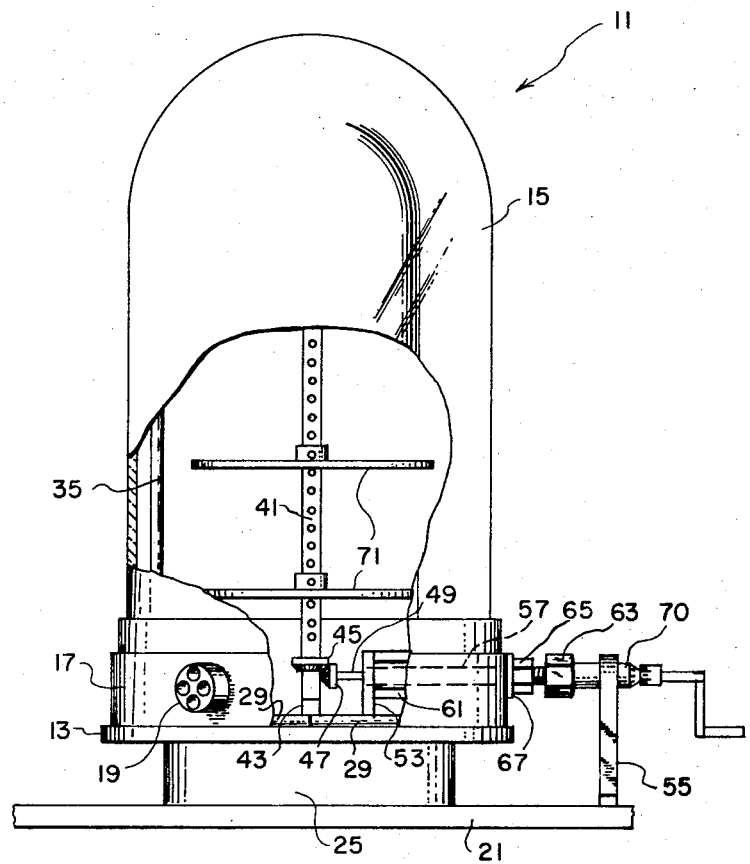
FIG. 1 is an elevational view, partially broken away, of a bell jar vacuum chamber provided with a test stand system according to the present invention.

Referring to FIG. 1, therein is shown a vacuum chamber 11 having a base 13 and a removable bell jar 15 supported on a feedthrough ring 17. Conventional vacuum-tight feedthrough fittings 19 are employed around the ring 17 to provide for vacuum-tight passage through the ring of various cables and conduits used in performing a vacuum test. The vacuum chamber is mounted on a supporting surface 21 and a passage 25 extending beneath the base 13 communicates with a vacuum pump (not shown).

The vacuum chamber 11, as described thus far, is well known in the prior art. The inventive test stand system associated with the vacuum chamber will now be described.

Figure 2:
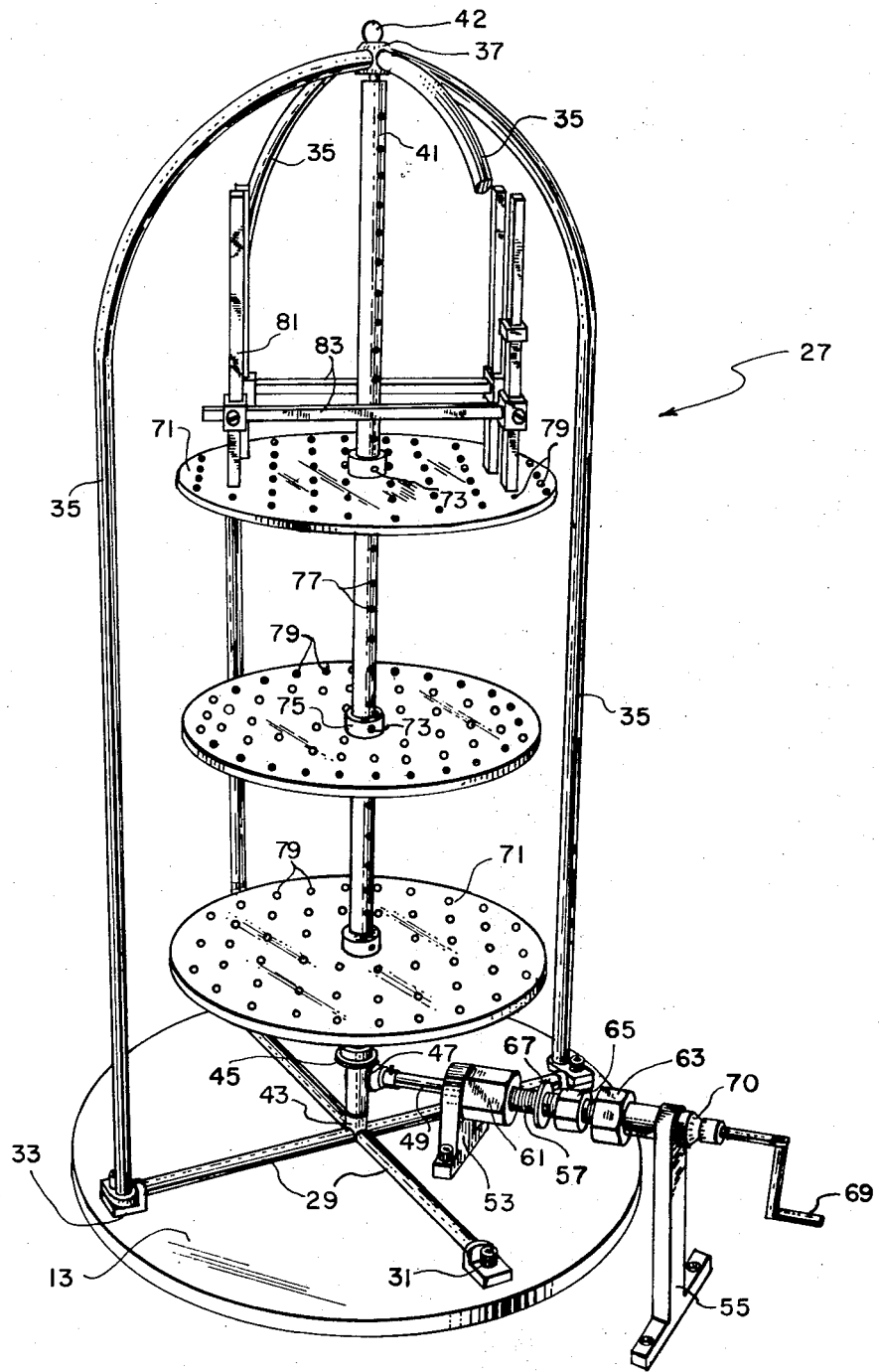
FIG. 2 is a pictorial view of the vacuum chamber of FIG. 1 with the bell jar and feedthrough ring removed to clearly show the test stand system of the present invention.

Within the bell jar 15 and supported on the base 13 is a frame 27 (FIG. 2) that in outline generally conforms to the bell jar 15. The frame 27 comprises 4 tubes 29 radially disposed on 90° spacings from the center of the base 13, being secured to the base by screws 31 extending through lugs 33. Joined to each of the lugs 33 by the screws 31 is a tube 35 that extends vertically and curves inwardly at the top corresponding substantially to the bell jar 15. The upper ends of the tubes 35 are welded to an internally threaded sleeve 37.

The frame 27 supports a rotatable shaft 41 located on the vertical axis of the frame. At its upper end the shaft 41 is pivotally attached to the frame 27 by a knobbed screw 42 that extends through the sleeve 27 and into a roller bearing assembly (not shown) in the upper end of the shaft 41. The lower end of the shaft 41 has a roller bearing assembly therein and is supported on a pedestal 43 to which the ends of the tubes 29 are welded.

Fixed to the shaft 41 near its lower end is a bevel gear 45 that meshes with a gear 47 fixed to the end of a rod 49 disposed perpendicular to the shaft 41. The rod 49 extends through the feedthrough ring 17 and is bearing supported by a bracket 53 mounted on the base 13 and by a second bracket 55 located outside of the vacuum chamber, being mounted on the supporting surface 21.

An externally threaded sleeve 57 (FIG. 2) is provided around the rod 49 over a portion of its length that passes through the feedthrough ring 17. At opposite ends the sleeve 57 is threaded into fittings 61 and 63 each of which have threaded sockets therein for receiving the sleeve. The rod 49 passes through the sleeve 57 and the fittings 61 and 63 with a vacuum-tight seal being provided within the fittings around the rod 49. A nut 65 is threaded over the sleeve 57 to clamp a washer 67 against the feedthrough ring 17 and produce a seal around the sleeve 57 (FIG. 1). A handle 69 is attached to the outer end of the rod 49 by which the rod may be manually rotated to rotate the shaft 41. An index dial assembly 70 is provided to indicate degrees of rotation and position of the shaft 41.

A plurality of plates 71 are clamped to the shaft 41 by set screws 73 extending through flanges 75 forming openings at the center of the plates 71. Vertically spaced indentations 77 are formed in the shaft 41 to receive the ends of the screws 73. The positions of each of the plates 71 is quickly and easily adjusted vertically along the shaft 41 by means of the set screws 73. Holes 79 are provided in the plates 71 for receiving mounting screws for mounting bracket elements such as 81 and 83 for holding instruments and specimens as required for a particular test setup.

As is apparent from the above description, vacuum test setups may be arranged on each of the plates 71. After the bell jar 15 is installed and the vacuum established within the bell jar, the test setups may be rotated within the bell jar during the test without disturbing the vacuum by turning the handle 69.

I claim:

1. A test stand system for vacuum chambers comprising:
   a frame located within said vacuum chamber;
   said frame supporting a rotatable shaft;
   a plurality of plates releasably secured to and spaced longitudinally of said shaft;
   drive means for rotating said shaft;
   means located outside of said vacuum chamber for actuating said drive means.

2. The invention as defined in claim 1 wherein said vacuum chamber comprises a bell jar, said frame comprising a plurality of frame elements defining a space substantially corresponding to the space enclosed by said bell jar, said rotatable shaft being disposed substantially along the longitudinal axis of said bell jar, said shaft passing through the center of each of said plates.

3. The invention as defined in claim 2 wherein said drive means comprises a driven gear fixed on said shaft near one end thereof, a rod extending from the vicinity of said driven gear to the outside of said vacuum chamber, said rod having a driving gear thereon engaging said driven gear.

4. The invention as defined in claim 3 wherein said vacuum chamber comprises a feedthrough ring, said bell jar supported on said feedthrough ring, said rod passing through said feedthrough ring.

* * * * *